United States Patent
Nomula et al.

(10) Patent No.: US 11,769,175 B2
(45) Date of Patent: *Sep. 26, 2023

(54) SYSTEM FOR ASSISTING IN MARKETING

(71) Applicant: VOICEMONK INC., Cupertino, CA (US)

(72) Inventors: Jagadeshwar Nomula, Fremont, CA (US); Vinesh Gudla, Pleasanton, CA (US); Durga Prasad Velamuri, Fremont, CA (US)

(73) Assignee: VOICEMONK INC., Cupertino, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/484,779

(22) Filed: Sep. 24, 2021

(65) Prior Publication Data

US 2022/0012777 A1 Jan. 13, 2022

Related U.S. Application Data

(63) Continuation of application No. 15/441,239, filed on Feb. 24, 2017, now Pat. No. 11,144,964, which is a continuation-in-part of application No. 15/391,837, filed on Dec. 27, 2016, which is a
(Continued)

(51) Int. Cl.
| | |
|---|---|
| *G06Q 30/02* | (2023.01) |
| *G06Q 30/0251* | (2023.01) |
| *G06Q 30/0241* | (2023.01) |
| *G06N 20/00* | (2019.01) |
| *G06N 3/006* | (2023.01) |
| *G06N 20/10* | (2019.01) |
| *G06N 3/044* | (2023.01) |

(52) U.S. Cl.
CPC ........ *G06Q 30/0269* (2013.01); *G06N 3/006* (2013.01); *G06N 20/00* (2019.01); *G06Q 30/0277* (2013.01); *G06N 3/044* (2023.01); *G06N 20/10* (2019.01)

(58) Field of Classification Search
CPC ..... G06Q 30/0269; G06N 20/00; G06N 3/006
See application file for complete search history.

(56) References Cited

U.S. PATENT DOCUMENTS

| | | | |
|---|---|---|---|
| 7,457,397 B1* | 11/2008 | Saylor | H04M 15/56 |
| | | | 704/270.1 |
| 2005/0088981 A1 | 4/2005 | Woodruff et al. | |
| 2017/0083825 A1* | 3/2017 | Battersby | G06N 20/00 |

* cited by examiner

*Primary Examiner* — Loc Tran
(74) *Attorney, Agent, or Firm* — Mahesh Law Group; Kumar Maheshwari

(57) ABSTRACT

A system for assisting a customer is provided. The system comprises a database comprising multimedia files, wherein one or more tags are associated with one or more of the multimedia files. The system further comprises a virtual agent server 100 configured to receive input from a first user (customer) and a second user (customer service representative). Further, the virtual agent server 100 processes the received input to understand a context of the input. Subsequently, the virtual agent server 100 identifies one or more multimedia files based on the context and the tags associated with the multimedia files. Subsequently, the virtual agent server 100 shares at least one of the identified multimedia files with at least one of the first user and the second user to enable better understanding between the first user and the second user.

7 Claims, 5 Drawing Sheets

Related U.S. Application Data continuation-in-part of application No. 15/356,512, filed on Nov. 18, 2016, now Pat. No. 11,068,954.

(60) Provisional application No. 62/318,762, filed on Apr. 5, 2016, provisional application No. 62/275,043, filed on Jan. 5, 2016, provisional application No. 62/257,722, filed on Nov. 20, 2015.

SYSTEM FOR ASSISTING IN MARKETING

CROSS-REFERENCE TO RELATED APPLICATION

This application claims priority as a continuation of currently pending U.S. patent application Ser. No. 15/441,239, filed Feb. 24, 2017, which claims priority as a continuation-in-part of U.S. patent application Ser. No. 15/391,837, filed Dec. 27, 2016, which claims priority as a continuation-in-part of currently pending U.S. patent application Ser. No. 15/356,512, filed Nov. 18, 2016, which is a non-provisional application claiming the benefit of Provisional Patent Application Ser. Nos. 62/257,722, 62/275,043 and 62/318,762, filed Nov. 20, 2015, Jan. 5, 2016 and Apr. 5, 2016, respectively. The entire disclosures of all said prior applications are hereby incorporated by reference.

BACKGROUND

Technical Field

The subject matter in general relates to the field of virtual marketing systems. More particularly, but not exclusively, the subject matter relates to a virtual assistant for assisting in marketing.

Discussion of Related Art

Marketing plays a vital role in creating awareness and subsequently selling products or services offered by an organization to customers. However, current forms of marketing like Short Message Service marketing, e-mail marketing, and marketing done on websites offer only small or short advertisements to customers that contain limited information about the advertised product. Thus, the customer may be left with several doubts or confusions after viewing an advertisement. Further, since there are no direct provisions to clear a customer's doubts while viewing an advertisement, customers may lose interest in the product, thus resulting in the loss of sales for the organization. The customers viewing an advertisement need to be educated to enable them to make an informed purchase decision.

In conventional systems, the displayed ads are not actionable. For instance, an advertisement to buy a pair of Nike Shoes for a retailer like Walmart shows up in a user's browser. In case the user is interested in buying the shoes, they must enter their credentials and complete the checkout. The advertisement does not indicate which user it is displaying for. Further, conventional systems do not personalize the conversational interaction.

Conventional systems do not address these issues. Thus, conventional systems result in loss of sales for organizations. Further, with the current increase in the viewing of virtual advertisements from people using computers, mobile phones and other electronic devices, it is of prime importance to have improved systems solving these problems.

SUMMARY

Accordingly, a system for enabling a computing system to converse with a person in a natural human language is provided, wherein the system comprises a plurality of nodes. Further, a first set of nodes represent statements that can be made by a human and a second set of nodes represent statements that can be made by the computing system. The first set of nodes and the second set of nodes are interconnected and the interconnection enables the computing system to select at least one of the statements represented by one of the second set of nodes, based on a statement from the human, which is mapped to one of the statements represented by one of the first set of nodes.

Further, a system for communicating advertisements during a digitally enabled conversation is provided. The system is configured to track a conversation between at least a first entity and a second entity. Further, the system communicates an advertisement as part of the conversation, wherein the advertisement is directed at the first entity. Subsequently, the system identifies if a response by the first entity, as part of the conversation, is for the advertisement; and carries out at least one action if the response is to the advertisement.

Accordingly, an improved technique to overcome the above problems is needed. To fulfil this need, a system configured to assist a customer is provided. Other objects, features, and advantages of the present disclosure will become apparent from the following detailed description. It should be understood however, that the detailed description and specific examples, while indicating preferred embodiments of the present disclosure, are given by way of illustration only and various modifications may naturally be performed without deviating from the present disclosure.

BRIEF DESCRIPTION OF DIAGRAMS

Embodiments are illustrated by way of example and not limitation in the Figures of the accompanying drawings, in which like references indicate similar elements and in which.

DETAILED DESCRIPTION OF EMBODIMENTS

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present disclosure may be practised without these specific details. In other instances, well-known methods, procedures and components have not been described in detail so as not to unnecessarily obscure aspects of the embodiments. The embodiments can be combined; other embodiments can be utilized or structural and logical changes can be made without departing from the scope of the present disclosure. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "A but not B," "B but not A," and "A and B," unless otherwise indicated.

It should be understood that the capabilities of the embodiments described in the present disclosure and elements shown in the figures may be implemented in various forms of hardware, firmware, software, non-transitory recordable medium or combinations thereof.

Overview

The embodiments disclose techniques used to solve problems in advertising with the help of virtual agent servers 100. A virtual agent server 100 can share advertisements with a user and can clarify the user's doubts about the advertisement. The virtual agent server 100 can converse with the user until all their doubts are cleared, and can place orders on behalf of the user. Further, the virtual agent server 100 can decide what type of advertisement to share with the user by considering the activities of the user. A common identifier can be used to aggregate and analyse the activities of the user.

In an implementation, a virtual agent server 100 may communicate advertisements to a user, receive inputs from the user and reply to the user. The virtual agent server 100 may try to clarify doubts of the user or complete a task for the user.

Virtual Agent System

Figure 1:
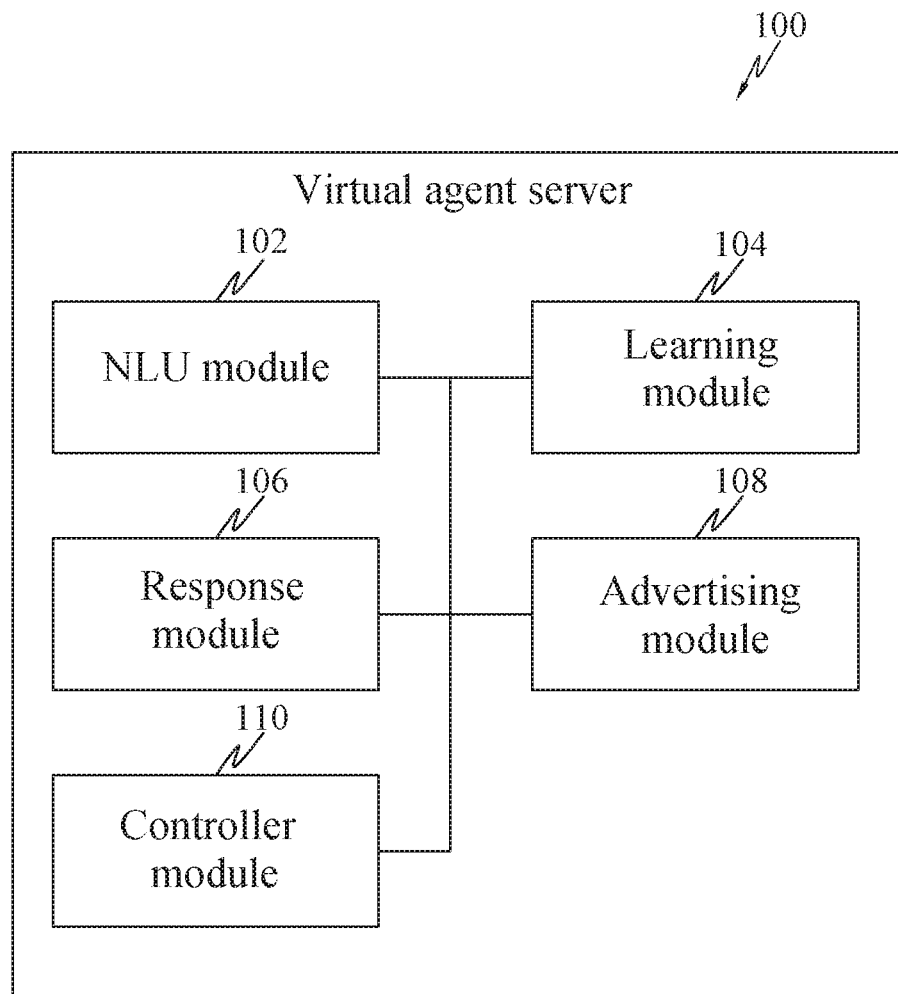
FIG. 1 depicts an exemplary architecture of a virtual agent server 100, in accordance with an embodiment.

FIG. 1 depicts an exemplary architecture of a virtual agent server 100, in accordance with an embodiment. The virtual agent server 100 may include a Natural Language Understanding (NLU) module 102 to understand the speech of the user, a learning module 104, a response module 106 to determine responses for the user, an advertisement module 108 and a controller module 110.

In an implementation, the Natural Language Understanding Module 102 (hereafter called NLU module 102) may be used by the virtual agent server 100 to understand the natural speech of the user. In an implementation, the NLU module 102 may receive the user's natural speech as an input. This natural speech may be in the form of audio information or text in a natural language format. Further, the NLU module 102 may parse information from the received natural language speech to determine one or more pieces of information corresponding to the user from the speech of the user. The determined user information may include one or more of the user's desired action and context of the desired action, among others.

In an implementation, one or more inputs may be derived from one or more previous or current communication sessions between two or more among a first user (customer), a second user (customer service representative) and a virtual agent server 100.

In an implementation, the NLU module 102 may use machine learning classification and natural language processing techniques to determine the intent of the conversation. The NLU module 102 may also query a graph which may model conversations on an inverted index to figure out the search intent (as discussed below).

In an implementation, the NLU module 102 may determine the user's intent and use slot filling algorithms to determine different objects in the sentence. The slots associated with the application may be learnt by pattern matching or using neural network technique by feeding slot outputs and conversation inputs from previous interactions.

In an implementation, the learning module 104 may be used by the virtual agent server 100 to receive one or more sets of data to train on. Further, the learning module 104 may use the received training data to learn and store different types of speech or text responses for different situations faced by the virtual agent server 100 while communicating with the user.

In an implementation, the learning module 104 may be configured to receive and process one or more recordings of conversations between a customer service representative and a user. Further, the learning module 104 may convert the conversation between the user and customer service representative from natural speech format to device-readable format. The learning module 104 may use one or more speech-to-text recognition techniques to analyse the conversation for learning and store them in a database for future use. The stored conversations may be used to improve the intelligence of the virtual agent server 100 on a continuous basis by storing the conversations in a graph data structure on an inverted index for efficient retrieval in future conversations.

In an implementation, the learning module 104 may identify and store one or more conversation dialogues as parent nodes. These parent nodes may comprise dialogues spoken by the user that require a response from the virtual agent server 100. Further, the learning module 104 may identify and store one or more dialogues as child nodes which are used as responses corresponding to the one or more identified and stored parent nodes. Elaborating further, in an implementation, a dialogue may be defined by the learning module 104 as the smallest element in a conversation between a user and a virtual agent server 100 or a business organization. A dialogue may be represented by two nodes with an edge between them.

In an implementation, a graph may be constructed manually by an interaction designer, which may then be inserted on inverted index. In yet another implementation, in case a great amount of training data is available to the virtual agent server 100, a recurrent neural network may be trained on the interaction between the customer and the customer service representative by using the training data.

In an implementation, the response module 106 may be used by the virtual agent server 100 to generate one or more different responses to be shared with the user in different scenarios. A user may initiate a response to an advertisement which in turn may require a response from the virtual agent server 100 to the user.

In an implementation, the response module 106 may receive inputs from the NLU module 102 comprising the user's conversation and the context of the user's conversation. Further, the response module 106 may identify one or more recent dialogues in the current conversation that require a response from the virtual agent server 100 to the user. The response module 106 may retrieve one or more parent nodes to identify a parent node which is most suitable to the recent dialogue in the current conversation between the user and the virtual agent server 100. Subsequently, the response module 106 may retrieve one or more child nodes corresponding to the identified parent node. Further, the identified child nodes may be communicated to the user during the conversation.

In an implementation, the response module 106 may build a bipartite graph with a hierarchy of dialogues to converse with the user. The dialogues may be connected and branched away in case one or more new combinations arise during conversations across different communication platforms. The graph may be built on an inverted index data structure to support efficient text search.

In an implementation, as an example, an initiation sentence from the virtual agent server 100 such as "Hello, {Customer Name}! This is {Company}. How can I help you?" may be represented as the root node of a graph. The data in the node may comprise one or more placeholders for one or more of the user's name, and the business name, among others. The placeholders in the conversation for building the graph may be identified by looking for fuzzy string matches from the input dictionary comprising one or more inputs such as the business name, the customer name and the items served by the business, among others.

In yet another implementation, one or more Name Entity recognition techniques may be used to identify the labels in the input.

In an implementation, a node may be annotated with information regarding whether the user or the virtual agent server 100 was the speaker of the dialogue corresponding to that node. The node may also comprise one or more features such as semantic mappings of the sentence and vector computed using sentence2vec algorithm by training a Recurrent neural network on the domain that the software agent is trained for.

In an implementation, a different semantic response from the user may be used to create a child node for the parent node corresponding to the dialogue shared by the virtual agent server 100. The semantic equivalence to the existing nodes on the graph is achieved. In an implementation, the semantic equivalence of two nodes may be calculated by computing cosine similarity between the top results from one or more learn-to-rank algorithms, including, for example, Lambda Mart, borrowed from one or more search techniques after doing a first pass inexpensive ranking on the inverted index of the graph of conversation.

In an implementation, the result from a learn-to-rank algorithm with the highest score exceeding a certain threshold may be used as a representative for the user input. The semantic equivalence comparison and scoring may be done after tokenizing, stemming, normalizing and parametrizing (recognizing placeholders) the input query. Further, one or more slot filling algorithms may be used to parametrize the user responses. The slot filling algorithms may use HMM/CRF models to identify one or more part of speech tags associated with keywords and statistical methods to identify one or more relationships between words. In case there is a match to an existing dialogue from the user, the response module 106 may store the dialogue context of the existing dialogue instead of creating a new node. In case there is no match, a new node may be added to the node of the last conversation.

In an implementation, some dialogues may be questions with straightforward answers. As an example, consider a user asking a question to a virtual agent server 100 representing a restaurant:

User: "What is your specialty?".

Virtual agent server 100: "Our specialty is Spicy Chicken Pad Kee Mow".

In another implementation, a user may converse with a virtual agent server representing a shopping website:

User: "Is anything on sale?"

Virtual agent server 100: "Yes, there is a sale of 20% off on all electronic gadgets."

These dialogues may be indexed on the graph as orphan parent-child relationships in the graph.

In an implementation, a change in context may be a common challenge while building a graph that may constantly learn. In case there is no change in the context, a node may be created as a child of the previous node. In case there is a change in the context, a new node may be needed which is different from the previous state in the graph. In an implementation, one or more classifiers such as a Bayesian or SVM Machine Learning classifier may be used to determine a change in context when the user talks to the customer service representative. The classifier may be trained on crowd sourced training data using one or more features. These features may include one or more of: number of tokens common to a current and previous task; and matching score percentage between the user's speech and the maximum score match of an existing dialogue. A different classifier may be trained for different domains to improve the accuracy of the classifier.

In an implementation, Neural Networks may be used by the virtual agent server 100 to implement personalisation in the conversation with the user. The virtual agent server 100 may be provided with training data comprising one or more stored conversations between two humans. Subsequently, one or more cluster algorithms identified online may be used to train one or more models with the training data received by the virtual agent server 100. Subsequently, one or more user features may be included in the model to accomplish personalization while conversing with the user.

In an implementation, one or more user profiles may be clustered into one or more macro groups to implement personalization to models in a recurrent neural network. An unsupervised clustering algorithm such as K-Means clustering may be used to accomplish this. Alternatively, manually curated clusters may be created based on one or more information about the user such as age group, location and gender of the user, among others. Further, the weight of the examples that had a positive conversion from the virtual agent server 100 may be boosted. In an implementation, this may be achieved by duplicating positive inputs in the training data. The positive inputs may be characterized by one or more pieces of information including the order price and satisfaction from the user, among others. Additionally, one or more user features such as age and gender can be added as an additional input for the Machine Learning models.

In an implementation, the idea of personalization in neural networks may not be specific to conversational customer interactions and may be used in one or more situations including building models which send automatic responses to emails. In an implementation, the graph on the inverted index may be used by a virtual agent server 100 to answer questions about the business. The virtual agent server 100 may start from the root node of the graph to greet the user during a conversation on one or more of a call, SMS or messenger. The user may respond to the greeting with a question about the business. Subsequently, the response module 106 may search for the closest match to the user's question by using techniques borrowed from information retrieval. In an implementation, this may be accomplished using an inverted index to look up possible matches for the user input using an in-expensive algorithm initially and then evaluating the matches with an expensive algorithm such as a Gradient Boosted Decision Tree. The response module 106 may run one or more stemming, tokenization and normalization algorithm on the input query to make sure that the input may be searched properly by the algorithms looking for match before hitting the inverted index.

In an implementation, the advertisement module 108 may be used by the virtual agent server 100 to identify one or more advertisements that the user may be interested in. Further, the advertisement module 108 may be used to communicate the identified advertisements with the user.

In an implementation, the advertisement module 108 may analyse user actions online and offline by collecting their search and browse actions on one or more websites such as FACEBOOK and GOOGLE, among other websites and web applications. Further, the advertisement module 108 may receive offline records from credit transactions.

In an implementation, an identifier for the user may include an email-id, username or a common identifier. This identifier may be used to aggregate information corresponding to one or more actions made by the user. The advertisement module 108 may use one or more big data technologies such as Hadoop, Map-reduce paradigm and one or more real time offline processing frameworks such as Apache Kafka or Spark to aggregate information. For example, in an implementation, information corresponding to one or user actions may be transferred using Apache Kafka, stored on Hadoop file system and Map-reduce paradigm may be used to aggregate the data points for a user.

In an implementation search queries and websites used by the user may be analysed to derive items the user is interested in. Additionally, advertisements may be customized before communicating the advertisement to the user. One or more placeholders present in the advertisement may be customized to include the user's information at run-time.

In an implementation, the aggregated actions of the user may be used to identify which stage the user is currently in, compared to the advertiser's objectives. For example, in case the user is browsing web pages of camera review sites by entering broad queries such as "best camera" or "camera reviews", the virtual agent server 100 may determine that he is in the discovery stage.

In an implementation, the aggregated actions of the user may be obtained from one or more current or previous communication sessions involving the user, wherein the communication session was tracked.

In an implementation, the aggregated actions of the user may be obtained from one or more external sources, wherein the external source comprises one or more web applications used by the user or one or more databases comprising information about the user.

In an implementation, the virtual agent server 100 may provide a service to the user to help with completion of transaction after the user has viewed an advertisement and wishes to place an order. The virtual agent server 100 may share one or more advertisements with the user to monetize the transaction service. One or more advertisers may bid on keywords and user profiles similar to online advertisement platforms including Facebook and google ads.

In an implementation, the advertiser's messages for a natural language conversation may be crafted using manual curation. Taking an example of a retailer, the advertiser may use three stages of a purchase funnel. In the first stage, an interaction designer may model the conversation as a "discovery stage" where multiple choices corresponding to a particular type of product may be shown. In the second stage, individual products that the user may be interested in and information about the individual product may be shared with the user. In the third stage, a call for action can be shared with from the user. This call for action may comprise of an offer corresponding to the product which was communicated to the user in the second stage.

In an implementation, a Support Vector Machine learning classifier may be used to determine the conversation intent and stage in the purchase channel after training it with one or more features such as search keywords, domains and categories of the web pages visited by the user. Further, the conversational marketing may be modelled as a graph on an inverted index as discussed above. Additionally, the virtual agent server 100 may use one or more learn to rank algorithms such as Gradient Boosted Decision Tree to identify a match for the user context. Making customer interactions conversational by modelling it as a graph on an inverted index hosted on a machine may make the system work efficiently for millions of businesses.

An example of the three advertisement stages may be as follows:

In the first stage, the user may be searching for a broad type of product. The first stage advertisement may include multiple products with a message "Here are some {items}", where {items} are the product names derived from the actions of the user. In case the user shows interest in the first stage advertisement, a second stage advertisement showing individual product(s) may be shared with the user, along with a message "See this {specific item} on AMAZON". In case the user shows further interest in the second stage advertisement, a third stage advertisement may be shared with the user which includes offers for the individual products shared in the second stage advertisement. Further, a message may be shared with the user stating: "Two days free shipping on {specific item} for the next 5 hours".

Additionally, an advertising message may then be generated for the user shopping intent which includes one or more appropriate text, image, audio clip, video clip or hyperlink. The advertisement may be shared with the user when they visit a website or watch a video using one or more of an ad network, ad exchange or directly integrated-into-ad platform such as FACEBOOK and GOOGLE which have high traffic.

In an implementation, the controller module 110 may coordinate between other modules of the virtual agent server 100 to assist users in a customer service. Further, the controller module 110 may comprise instructions regarding the actions to be taken by the virtual agent server 100.

In an implementation, the controller module 110 may need to communicate with one or more different application programming interfaces to gain knowledge regarding external systems. As an example, the virtual agent server 100 may communicate with one external application to get customer information and with another external application to get customer service cases. The current application programming interface based communication has become complex to automate as it requires a developer of the software to create mapping between the user context and external application programming interfaces. Further, an application programming interface may be automated by using semantic understanding of the capabilities of the systems. This may be accomplished by creating a global registry of application programming interfaces, with annotations assigned to the parameters with synonyms of the keys which may make it easier for the consuming services to map the runtime context to the parameters. Alternatively, a universal language and a sequence of exchanges for associating input context to an external application programming interface may be created.

In an implementation, the virtual agent server 100 may be able to communicate one or more relevant advertisements to the user when the user is waiting on the completion of a task. In this case, the controller module 110 may determine whether to communicate an advertisement to the user. This may be done by starting another asynchronous thread/process to initiate the execution of the suggestion on behalf of the user. The virtual agent may use the current thread to deliver an advertisement. Simultaneously, the controller module 110 may communicate a message to the user regarding the execution of the suggestion.

As an example, the virtual agent server 100 may communicate the following message to the user: "I am confirming your order with the customer service of the restaurant Olive Garden. For your next special order, please consider "California Pizza Kitchen". They have introduced a new dish called Vegetarian Lasagne which you might like". This communication may be an audio, video or a text advertisement.

As another example, in a retail store context, the customer may place an order. Further, the virtual agent server 100 may communicate the following message to the user: "I am confirming your order with Amazon. For your next purchase, please consider "Buyer's Best Electronics goods.". They are offering a discount on Bluetooth speakers which you may like".

In an implementation, the advertisement module 108 displays the advertiser's advertisement as follows: the advertisement module 108 may search through the advertiser database and load information corresponding to ads. Further, the advertisement module 108 may assign rank to the advertisements related to one or more of: revenue, preferences of the users, relevance to the user's desired action and to the context of the desired action. Subsequently, the advertisement module 108 may then communicate the advertisement to the user. In an embodiment, a learn to rank algorithm may be used to rank the search results.

Figure 2:
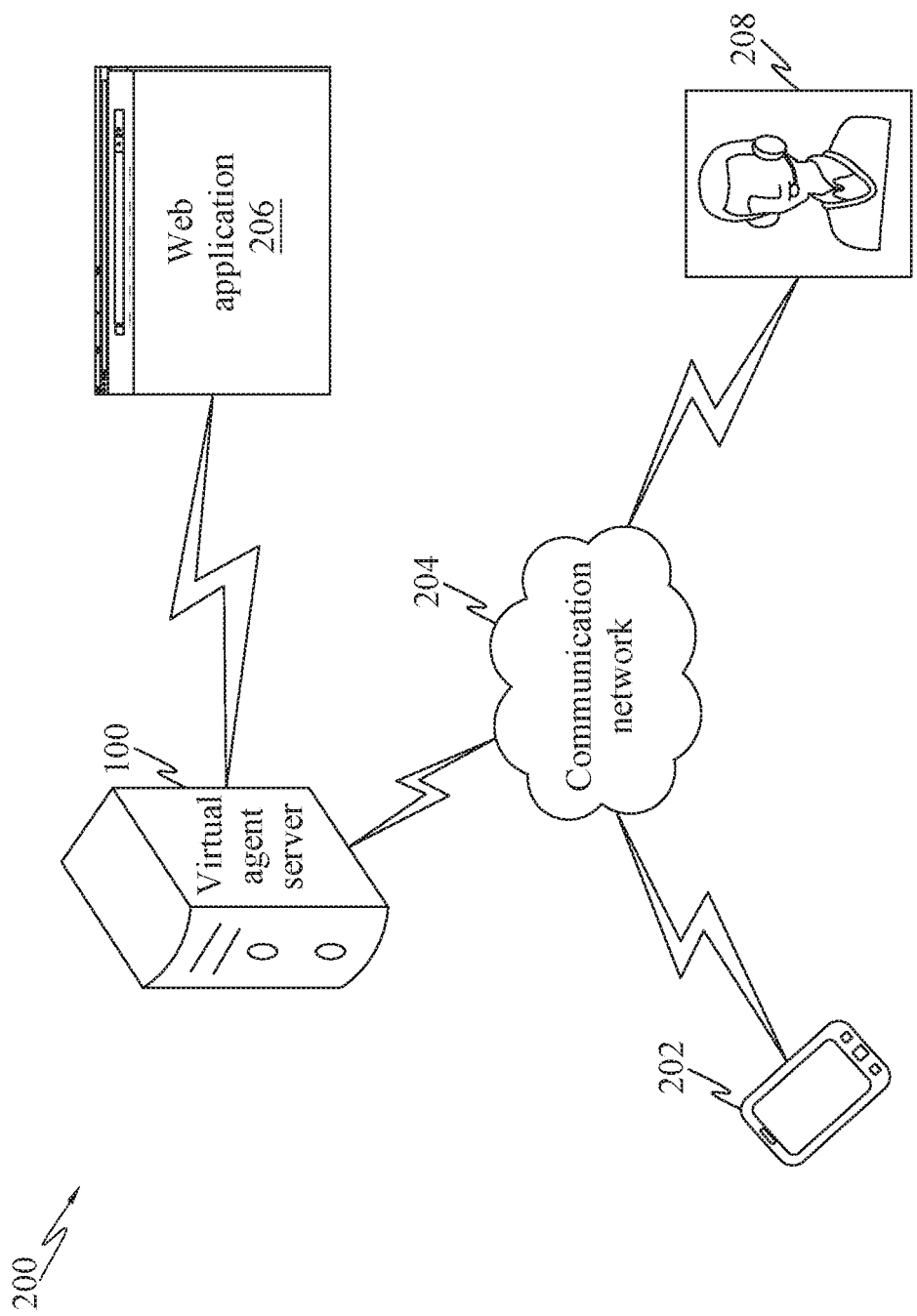
FIG. 2 depicts a system 200 including the virtual agent server 100 for assisting in conversational marketing, in accordance with an embodiment.

In an implementation, FIG. 2 depicts a system 200 comprising a virtual agent server 100 which may represent a web application 206 of a business. The virtual agent server 100 may communicate with a user through their user's mobile device 210a and 210b using a short message service channel 204, a phone call channel 206 or a social network 208.

In an implementation, the system 200 may track a conversation between the user and a web application 202. Further, the virtual agent server 100 may communicate an advertisement directed at the user as part of the conversation between the user and the web application 202. The virtual agent server 100 may receive one or more responses from the user and identify the response is for the advertisement. Further, the virtual agent server 100 may carry out at least one action if the user responded to the advertisement.

In an implementation, the user's mobile device 210 may include mobile phones, palmtops, PDAs, tablet PCs, notebook PCs, laptops and computers, among other computing devices. In an embodiment, the user's mobile device 210 may include any electronic device equipped with a browser to communicate with the virtual agent server 100. The user's mobile device 210 may belong to a user who may use it to communicate with the virtual agent server 100. In an implementation, the user's mobile device 210 communicate with the virtual agent server 100 and share inputs related to the user with the virtual agent server 100.

In an implementation, the virtual agent server 100 may be implemented in the form of one or more processors with a memory coupled to the one or more processors with one or more communication interfaces. The virtual agent server 100 may communicate with one or more external sources and one or more users' mobile devices 210 through a short message service channel 204. It may be noted that some of the functionality of the virtual agent server 100 may be implemented in the user's mobile device 210.

The system 200 may enable a computing system to converse with a human, wherein the system comprises a plurality of nodes. In an implementation, a first set of nodes may represent statements that may be made by a human, and a second set of nodes may represent statements that may be made by the computing system. The first set of nodes and the second set of nodes may be interconnected such that the interconnection enables the system 200 to select at least one of the statements represented by the second set of nodes, based on a statement from the human, which is mapped to one of the statements represented by first set of nodes.

In an implementation, at least one of the first set of nodes may be directly connected to a plurality of second set of nodes.

In an implementation, the system may be configured to select one or more among the second set of nodes, as a response to a statement represented by one of the first set of nodes to which the second set of nodes is directly connected. The second set of nodes may be selected based on a path navigated to reach the first set of nodes to which the second set of nodes is directly connected.

In an implementation, the system may be configured to enable a customer service representative to converse with the human in case a statement made by the human is not mapped to any of the first set of nodes.

In an implementation, the system may be configured to enable a customer representative to converse with the human in case a statement made by the human is mapped to one of the first set of nodes, which is not connected to any of the second set of nodes at a lower hierarchy.

In an implementation, the system may be configured to generate the first set of nodes and the second set of nodes by processing one or more learning data. In an implementation, the learning data may comprise conversation data between a first category of humans and a second category of humans. Further, the system 200 may be configured to build the interconnection by processing the learning data.

Figure 3:
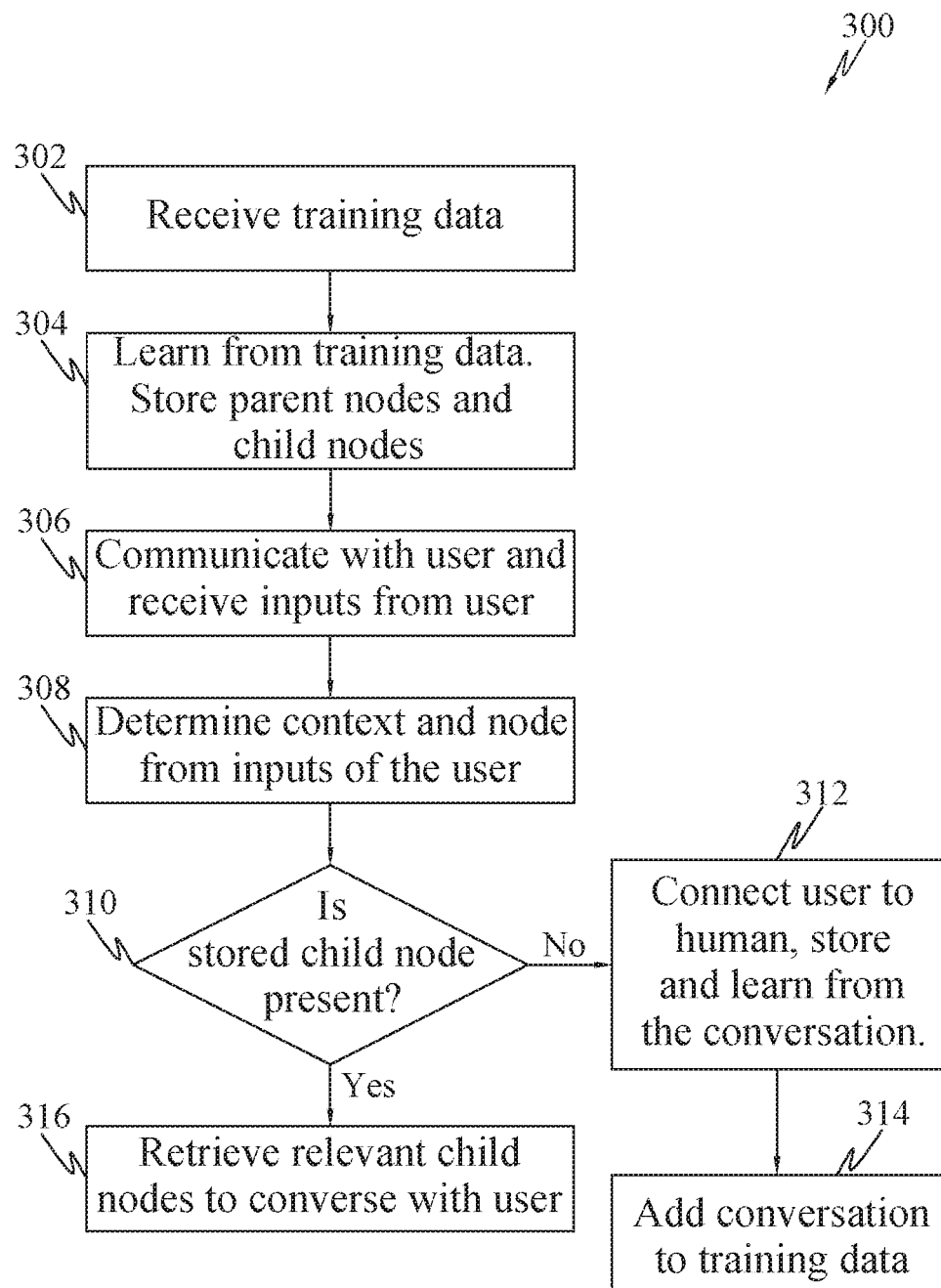
FIG. 3 depicts a flowchart of an exemplary method 300 for interactive advertisement with a user, in accordance with an embodiment.

In an implementation, FIG. 3 depicts a flowchart of an exemplary method 300 for interactive advertisement with a user, in accordance with an embodiment. In an implementation, the virtual agent server 100 may receive one or more sets of training data as shown at step 302. The training data may be processed as discussed above. Subsequently, the virtual agent server 100 may learn how to build a conversation by using the training data. Further, one or more parent nodes and their corresponding child nodes may be stored in a database as shown at step 304. The parent node may represent a dialogue and the child node may represent the response dialogue corresponding to the dialogue stored in the parent node.

In an implementation, the virtual agent server 100 may communicate one or more advertisements to the user. In case the user shows an interest, they may respond to the advertisement. The inputs may be received by the virtual agent server 100 as shown at step 306. Further, the virtual agent server 100 may understand the speech of the user by converting it into text and determining a, context of the conversation with the user. Further, the virtual agent server 100 may try to determine one or more dialogues that may be similar to the stored parent nodes as shown at step 308. Subsequently, the virtual agent server 100 may retrieve one or more child nodes corresponding to the determined parent node as shown at step 310. In case the virtual agent server 100 has determined that there were no stored child nodes, building further conversation with the user may not be possible. Hence, at step 312, the virtual agent server 100 may connect the user to a human being. This human may be a company representative or a customer service representative, among others. The conversation between the user and the human may be processed by the virtual agent server 100 for processing and learning. Further, the conversation may be added to the training data as shown at step 314.

In case the virtual agent server 100 has determined the presence of a stored child node, it may be retrieved and the dialogue corresponding to that node may be communicated from the virtual agent server 100 to the user.

Figure 4:
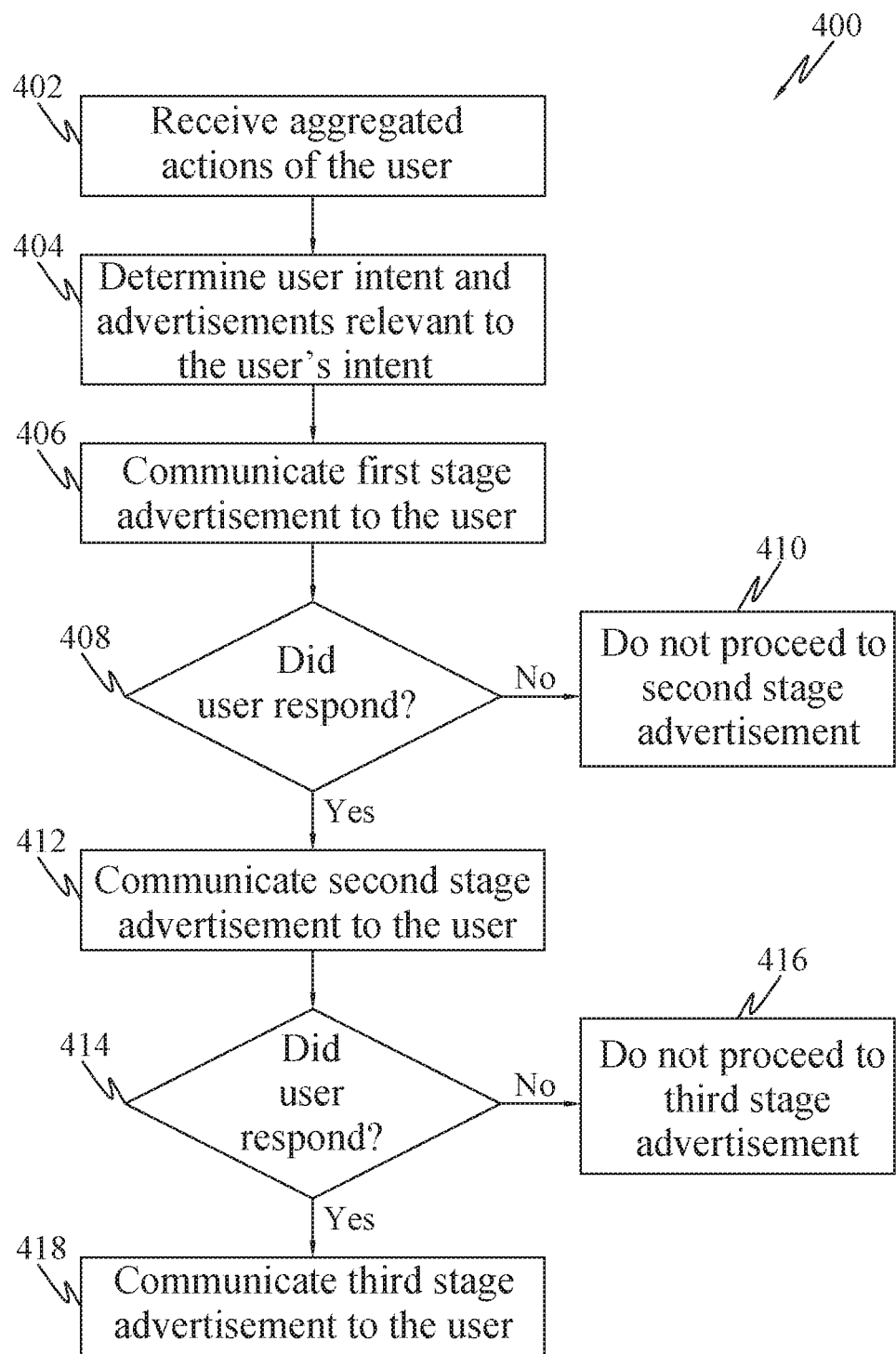
FIG. 4 depicts a flowchart of an exemplary method 400 for communicating advertisements to a user, in accordance with an embodiment.

In an implementation, FIG. 4 depicts a flowchart of an exemplary method 400 for communicating advertisements to a user, in accordance with an embodiment. As depicted at step 402, the virtual agent server 100 may receive one or more aggregated actions of the user from one or more sources. Subsequently, the virtual agent server 100 may determine user intent based on the received aggregated actions of the user. Further, the virtual agent server 100 may communicate with one or more databases comprising advertisements to identify one or more advertisements that may be relevant to the user's intent as shown at step 404.

At step 406, the first stage advertisement may be communicated to the user. Further, at step 408, the virtual agent server 100 may determine whether the user responded to the first stage advertisement. In case the user didn't, the virtual agent server 100 may determine not to proceed to communicate a second stage advertisement to the user as shown in step 410.

In case the user did respond to the first stage advertisement, the virtual agent server 100 may determine to communicate the second stage advertisement to the user as shown at step 412.

Further, at step 414, the virtual agent server 100 may determine whether the user has responded to the second stage advertisement. In case the user didn't, the virtual agent server 100 may determine not to proceed to communicate the third stage advertisement to the user as shown at step 416.

In case the user did respond to the second stage advertisement, the virtual agent server 100 may determine to communicate a third stage advertisement to the user as shown at step 418.

In an implementation, the exemplary method 300 as described above may be used by a virtual agent server 100 in a customer service context. The virtual agent server 100 may use method 300 to act as a customer service representative and hold conversations with a user.

In an implementation, the user may be browsing online on one or more websites. Further, the user may be shown an advertisement, which may need to be encoded with information about the user to make the advertisement actionable for an organization. Further, the identity of the user may be encrypted to protect the user's privacy. Such encryption may be accomplished by using one or more methods such as one way hashes or public private key encryption mechanisms.

In an implementation, the virtual agent server 100 may identify the user by looking up one or more stored mapping information in one or more encrypted mapping between the user and the encrypted id in case the user starts to interact with the advertisement generated by the virtual agent server 100 on the social networks 210 and other external applications. The interaction with the user may be then personalized and one or more actions may be triggered for that advertisement.

In an implementation, the user information may include one or more of email-id, phone number, first name and last name combination. Further, the user information may be matched with similar identifiers on one or more social networks 210 and other external applications, among others. One or more user information may be exchanged with the social networks 210 and other external applications to make sure that the privacy of the user is protected. This may be achieved by using encrypted identifiers constructed from one or more user information.

In an implementation, the advertisement may be one or more of an actionable display, conversation or a bot advertisement, wherein the user may start interacting with the virtual agent server 100.

Figure 5:
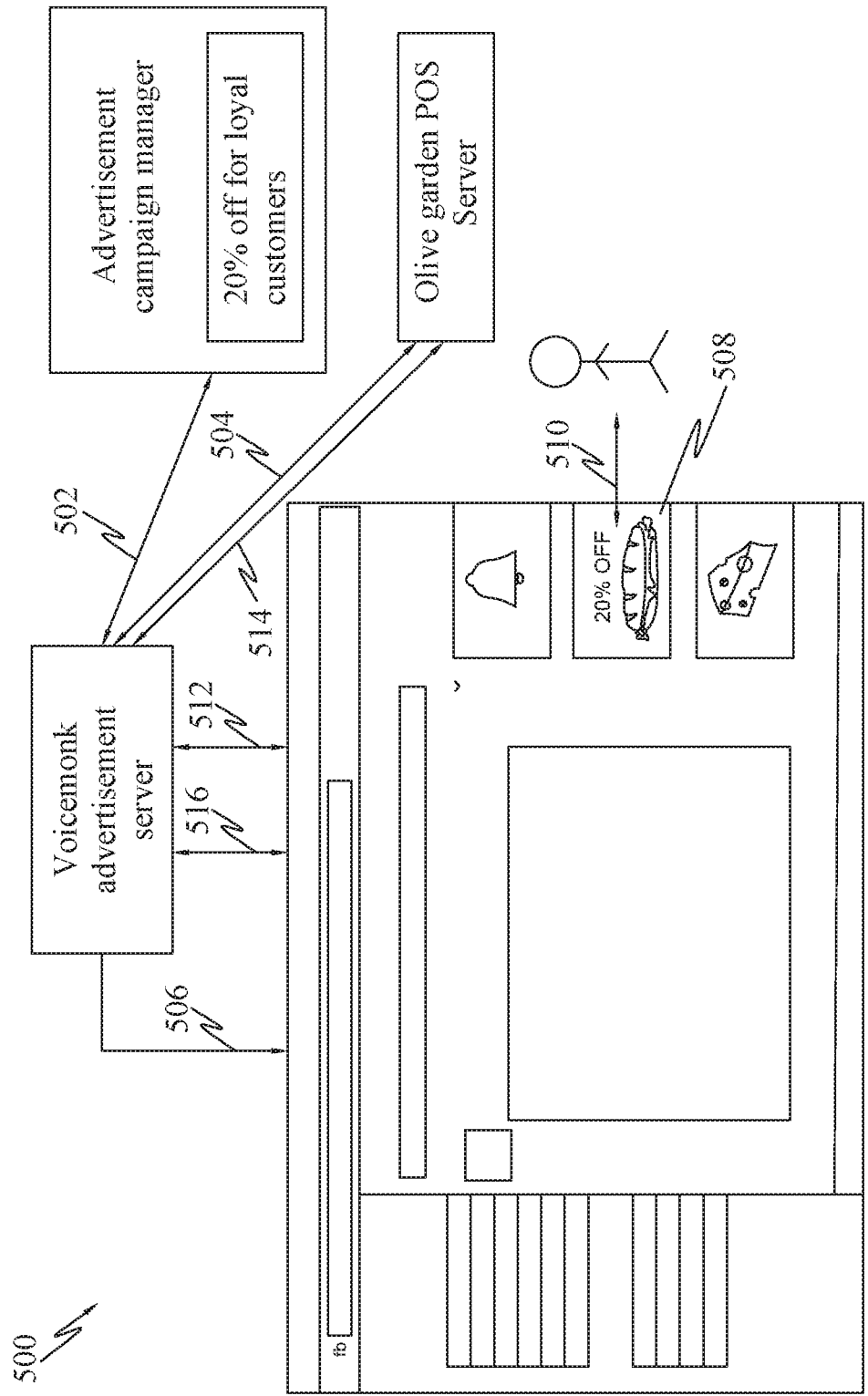
FIG. 5 depicts a flow diagram of an exemplary method 500 for communicating advertisements to a user through actionable marketing, in accordance with an embodiment.

FIG. 5 depicts a flow diagram of an exemplary method 500 for communicating advertisements to a user through actionable marketing, in accordance with an embodiment. As an example, Voicemonk advertisement server may provide a conversational advertisement service to an Italian Restaurant "Olive Garden". The Voicemonk advertisement server may communicate with a website being browsed by the user, an advertisement campaign manager and an Olive Garden Point of Sale (POS) server as shown in the figure.

In an implementation, a user "Tom" may be a regular customer of Olive Garden, who has not visited the restaurant recently. The Voicemonk advertisement server may be responsible for engaging Tom to make him visit the restaurant. The Voicemonk advertisement server may display an actionable advertisement by using one or more user information related to "Tom" to accomplish this. Hence, the Voicemonk advertisement server may communicate with the advertisement campaign manager regarding an advertisement which may include a 20% discount for loyal customers, as shown at step 502. Further, the Voicemonk advertisement server may communicate with the Olive Garden POS server regarding information details of loyal customers, as shown at step 504.

Further, in an implementation, the Voicemonk advertisement server may locate Tom and match the id information of loyal customer Tom as shown at step 506. Subsequently, the Voicemonk advertisement server may display an advertisement to Tom through the website or application that is being used by Tom. The advertisement may include a 20% off link only valid for Tom, as shown in the website at step 508: "It has been a while since you last came to Olive Garden. We are offering 20% discount for today's special, 'Italian Lasagna' to loyal customers like you. Please click on this ad to accept the offer and place an order."

In an implementation, Tom may click on the order as shown at step 510. Further, as shown at step 512, the Voicemonk advertisement server may be able to identify the user using the method described above. Subsequently, the virtual agent server 100 may communicate Tom's order at the Olive Garden POS server, as shown at step 514. Further, the Voicemonk advertisement server may communicate with Tom in a personalised natural language conversation as shown at step 516. The conversation may include calling up the restaurant, making reservations, clearing one or more doubts related to an order, and placing an order at the restaurant by calling the external Point of Sale Application Programming Interface, among others.

CONCLUSION

The present disclosure overcomes the drawbacks of the current marketing systems, by taking into consideration any doubts and clarifications a customer may have regarding an advertisement. Thus, the present disclosure as discussed in this document with respect to different embodiments will be advantageous at least in optimizing the process of virtual marketing. Further, it is advantageous in providing clarifications to customers with such doubts, providing better user experience and decreasing time and effort required by customers to enquire about an advertisement. It is also advantageous in helping the user to avoid the inconvenient process of coming up with different suggestions to suit multiple people. Additional advantages not listed may be understood by a person skilled in the art in light of the embodiments disclosed above.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present disclosure will no doubt become apparent to a person of ordinary skill in the art after having read the foregoing description. It is to be understood that the phraseology or terminology employed herein is for description and not of limitation. It is to be understood that the description above contains many specifications; these should not be construed as limiting the scope of the present disclosure but as merely providing illustrations of some of the personally preferred embodiments of this disclosure. Thus, the scope of the present disclosure should be determined by the appended claims and their legal equivalents rather than by the examples given.

We claim:

1. A method for conversing with a human, the method comprising:
    determining, by a processor coupled to a memory, a natural language of statements by a human;
    determining, by the processor, an intent based on the natural language of the statements of the human to purchase a type of product;
    determining, by the processor using a machine learning classifier, a stage of interest that the human is currently in to purchase the type of product;
    selecting, by the processor, a dialog to respond to the human based on the stage of interest;
    mapping, by the processor, the natural language of the statements to a plurality of nodes;
    wherein a first set of the plurality of nodes represent statements that can be made by the human;
    wherein a second set of the plurality of nodes represent statements that can be made to the human;
    wherein interconnections between the first set of nodes and the second set of nodes represent potential dialogs in a conversation with the human;
    wherein selecting the dialog comprises selecting an interconnection between the first set of nodes and the second set of nodes based on the stage of interest;
    wherein the stage of interest comprises a stage selected from the group consisting of a discovery stage, an information stage, and an action stage;
    wherein the second set of nodes comprise an advertisement that is based on the stage of interest; and
    wherein the advertisement in the action stage comprises an offer to sell an individual product.

2. The method of claim 1, wherein the advertisement in the discovery stage comprises multiple choices corresponding to a particular type of product.

3. The method of claim 1, wherein the advertisement in the information stage comprises information about an individual product.

4. A non-transitory computer readable storage medium with data stored therein representing a software executable by a computer having a processor coupled to a memory, the software comprising instructions that, when executed, cause the computer to perform:
    determining a natural language of statements by a human;
    determining an intent, based on the natural language of the statements, of the human to purchase a type of product;
    determining, using a machine learning classifier, a stage of interest that the human is currently in to purchase the type of product;
    selecting a dialog to respond to the human based on the stage of interest;
    mapping the natural language of the statements to a plurality of nodes;
    wherein a first set of the plurality of nodes represent statements that can be made by the human;
    wherein a second set of the plurality of nodes represent statements that can be made to the human;
    wherein interconnections between the first set of nodes and the second set of nodes represent potential dialogs in a conversation with the human;
    wherein selecting the dialog comprises selecting an interconnection between the first set of nodes and the second set of nodes based on the stage of interest;
    wherein the stage of interest comprises a stage selected from the group consisting of a discovery stage, an information stage, and an action stage;
    wherein the second set of nodes comprise an advertisement that is based on the stage of interest; and
    wherein the advertisement in the action stage comprises an offer to sell an individual product.

5. The non-transitory computer readable storage medium of claim 4, wherein the advertisement in the discovery stage comprises multiple choices corresponding to a particular type of product; and wherein the advertisement in the information stage comprises information about an individual product.

6. A computer system with a processor coupled to a memory, the memory storing instructions comprising:
    a database configured to store a plurality of nodes; wherein a first set of the plurality of nodes represent statements that can be made by a human; wherein a second set of the plurality of nodes represent statements that can be made to the human;
    wherein the processor is configured to: determine a natural language of statements by the human;
    determine an intent, based on the natural language of the statements of the human to purchase a type of product;
    determine, using a machine learning classifier, a stage of interest that the human is currently in to purchase the type of product;
    select a dialog to respond to the human based on the stage of interest;
    map the natural language of the statements to a plurality of nodes;
    wherein a first set of the plurality of nodes represent statements that can be made by the human;
    wherein a second set of the plurality of nodes represent statements that can be made to the human;
    wherein interconnections between the first set of nodes and the second set of nodes represent potential dialogs in a conversation with the human;
    wherein selecting the dialog comprises selecting an interconnection between the first set of nodes and the second set of nodes based on the stage of interest;

wherein the stage of interest comprises a stage selected from the group consisting of a discovery stage, an information stage, and an action stage;

wherein the second set of nodes comprise an advertisement that is based on the stage of interest; and wherein the advertisement in the action stage comprises an offer to sell an individual product.

7. The computer system of claim 6; wherein the advertisement in the discovery stage comprises multiple choices corresponding to a particular type of product; and wherein the advertisement in the information stage comprises information about an individual product.

\* \* \* \* \*